US006890661B2

(12) United States Patent
Pradel

(10) Patent No.: US 6,890,661 B2
(45) Date of Patent: May 10, 2005

(54) GRAFTED ISOTACTIC POLYPROPYLENE OBTAINED BY METALLOCENE CATALYSIS

(75) Inventor: Jean-Laurent Pradel, Bernay (FR)

(73) Assignee: ARKEMA, Puteaux (FR)

( * ) Notice: Subject to any disclaimer, the term of this patent is extended or adjusted under 35 U.S.C. 154(b) by 0 days.

(21) Appl. No.: 10/836,332

(22) Filed: May 3, 2004

(65) Prior Publication Data

US 2004/0202806 A1 Oct. 14, 2004

Related U.S. Application Data

(62) Division of application No. 10/208,192, filed on Jul. 31, 2002, now Pat. No. 6,750,288.

(30) Foreign Application Priority Data

Jul. 31, 2001 (FR) .............................................. 01 10252

(51) Int. Cl.⁷ ........................... B32B 9/04; B32B 15/08; B32B 27/00; B32B 27/08
(52) U.S. Cl. ........................ 428/446; 428/461; 428/515
(58) Field of Search ................................ 428/446, 461, 428/515

(56) References Cited

U.S. PATENT DOCUMENTS

| 5,374,685 A | 12/1994 | Asanuma et al. |
| 5,981,658 A | 11/1999 | Rajagopalan et al. |
| 6,150,462 A | 11/2000 | Rajagopalan et al. |
| 6,268,062 B1 * | 7/2001 | DeMeuse .................... 428/461 |
| 6,528,587 B2 | 3/2003 | Robert et al. |

FOREIGN PATENT DOCUMENTS

| EP | 0485983 | 5/1992 |
| EP | 1065245 | 1/2001 |
| FR | 2806734 | 9/2001 |
| JP | 09-003141 | 1/1997 |
| JP | 2000-234004 | 8/2000 |
| WO | WO 98/26001 | 6/1998 |
| WO | WO 00/47643 | 8/2000 |
| WO | WO 01/34389 | 5/2001 |

* cited by examiner

*Primary Examiner*—Nathan M. Nutter
(74) *Attorney, Agent, or Firm*—Millen, White, Zelano & Branigan, P.C.

(57) ABSTRACT

The present invention relates to an isotactic polypropylene obtained by metallocene catalysis, onto which is grafted a functional monomer.

The invention also relates to a composition which may form part of the composition of a coextrusion binder. This composition according to the invention comprises isotactic polypropylene obtained by metallocene catalysis, grafted and then optionally diluted with at least one polyolefin (C1) and/or in at least one polymer of elastomeric nature (D).

The invention also relates to a multilayer structure comprising a layer (L) comprising the above binder, and, directly attached thereto, a layer (E):
- which is polar, nitrogenous or oxygenated, such as a layer of polyamide resin, of ethylene/saponified vinyl acetate copolymer (EVOH) or of polyester; or
- of a mineral oxide deposited on a polymer such as polyethylene (PE), polyethylene terephthalate (PET) or EVOH; or
- which is metallic or metalloplastic.

34 Claims, No Drawings

… … …

GRAFTED ISOTACTIC POLYPROPYLENE OBTAINED BY METALLOCENE CATALYSIS

This is a divisional application of application Ser. No. 10/208,192, filed Jul. 31, 2002, now U.S. Pat. No. 6,750,288 B2 issued, Jun. 15, 2004 claiming priority of French application No. 0110252 filed Jul. 31, 2001.

The present invention relates to an isotactic polypropylene obtained by metallocene catalysis, onto which is grafted a functionalised monomer, and also to a composition comprising such a polymer. The invention also relates to a multilayer structure, at least one of the layers of which comprises isotactic polypropylene obtained by metallocene catalysis in its composition.

The isotactic polypropylene obtained by metallocene catalysis and grafted with a functionalised monomer may form part of the composition of a coextrusion binder. The coextrusion binder comprises isotactic polypropylene obtained by metallocene catalysis, grafted and then optionally diluted in at least one polyolefin (C1) and/or in at least one polymer of elastomeric nature (D).

These coextrusion binders are useful, for example, for manufacturing multilayer materials for wrapping. Mention may be made of materials comprising a polyamide (PA) film and a polypropylene (PP) film, the polypropylene film possibly being laminated over the polyamide film or coextruded with the polyamide. The coextrusion binder is arranged between the polypropylene film and the polyamide film for good adhesion of the two films. These multilayer materials may be, for example:

three-layer structures of the type such as, for example, PP/binder/EVOH in which EVOH denotes a copolymer of ethylene and of vinyl alcohol, or an ethylene/partially or totally saponified vinyl acetate copolymer, the binder layer being sandwiched between an EVOH layer and a PP layer, or five-layer structures of the type such as, for example, PP/binder/EVOH/binder/PP, in which the EVOH layer is sandwiched between two layers of binders, each of them being sandwiched between the EVOH layer and a PP layer.

The grafted polymer according to the invention may also be useful as a compatibilizer, for example in blends of polyamide and polypropylene or in blends of polypropylene and glass fibres.

Polypropylene is described in Kirk-Othmer, Encyclopedia of Chemical Technology, 4th edition, Vol. 17, pages 784–819, John Wiley & Sons, 1996. Almost all of the polypropylene sold consists essentially of isotactic polypropylene obtained by Ziegler-Natta catalysis, possibly containing a small amount of atactic polypropylene.

Extensive prior art exists describing grafted polypropylene, but this is always isotactic polypropylene obtained by Ziegler-Natta catalysis, abbreviated as zniPP in the text hereinbelow.

Document U.S. Pat. No. 5,235,149 describes wrappings closed with caps consisting of an aluminium foil, a binder layer and a polypropylene layer. The binder layer of the cap consists of various polymers grafted with acrylic acid or maleic anhydride, and the polymers may be chosen from polyethylene, polypropylene, copolymers of ethylene and of vinyl acetate and copolymers of ethylene and of methyl acrylate.

Documents DE 19 535 915 A and EP 689 505 describe a grafted polypropylene block copolymer for adhesively binding polypropylene films to metal sheets.

Document EP 658 139 describes structures similar to those described above, but the binder is a grafted random polypropylene copolymer comprising from 1 to 10% comonomer, the Mw/Mn ratio being between 2 and 10 and the MFI (melt flow index) is between 1 and 20/10 min (at 230° C. under 2.16 kg).

The free-radical grafting of functionalised monomers onto the polyolefins is performed either in the melt-or in solution using free-radical initiators, for instance peroxides, or in the solid state by irradiation. Under the action of the radicals, side reactions take place at the same time as the grafting reaction. They lead to an increase in the molecular mass in the case where the polymer to be grafted is polyethylene, or to a decrease in the molecular mass in the case where it is polypropylene. If the amount of free radicals required for the grafting reaction is large, the change in the molecular mass of the polyolefin leads to a large change in its melt viscosity. This grafting generally takes place in an extruder. The viscosity of the grafted polyethylene is then so high that it can no longer be extruded, whereas the viscosity of the grafted polypropylene is so low that it cannot be extruded either. These phenomena make it necessary to reduce the amount of reactive functions that may be incorporated into the polyolefin by free-radical grafting of functional monomers.

In the case of mixtures of virtually equivalent amounts of polyethylene and of polypropylene to be grafted by free-radical grafting with large amounts of functionalised monomers, as is the case in document EP 802 207, the increase in the molecular mass of the grafted polyethylene is compensated for by the decrease in the molecular mass of the grafted polypropylene.

It has now been found that a functionalised monomer can be grafted in large amount onto isotactic polypropylene obtained by metallocene catalysis (miPP) and that the melt flow index of the grafted miPP obtained is lower than in the case of the grafted isotactic polypropylene obtained by Ziegler-Natta catalysis (zniPP), thus making the grafted miPP or compositions comprising it easier to extrude.

Furthermore, it has been found that grafted miPP is advantageous in terms of application compared with the polypropylenes obtained by Ziegler-Natta catalysis during its use in coextrusion binders.

One subject of the invention is a composition comprising:
10% to 100% by weight of isotactic polypropylene homopolymer or copolymer obtained by metallocene catalysis (miPP);
0% to 90% by weight of polyethylene (A) homopolymer or copolymer;
0% to 90% by weight of polymer (B) chosen from isotactic polypropylene homopolymer or copolymer obtained by Ziegler-Natta catalysis (B1), poly-(1-butene) homopolymer or copolymer (B2), polystyrene homopolymer or copolymer (B3), a blend of (B1) and (B2), a blend of (B1) and (B3), a blend of (B2) and (B3) and a blend of (B1), (B2) and (B3); the percentages being based on the total weight of the isotactic polymer (miPP) and any polymer (A) and polymer (B); and,
the said polymer or polymers being grafted with a functional monomer.

According to one embodiment of the composition, the functionalised monomer is unsaturated and non-aromatic. The term "functionalised monomer" means a monomer comprising at least one chemical function.

According to one embodiment of the composition, the functionalised monomer is taken from the group comprising alkoxysilanes, carboxylic acids and derivatives thereof, acid chlorides, isocyanates, oxazolines, epoxies, amines and hydroxides.

According to one embodiment of the composition, the functionalised monomer is maleic anhydride.

According to one embodiment of the composition, at least one comonomer of polyethylene (A) copolymer is chosen from α-olefins containing from 3 to 30 carbon atoms, esters of unsaturated carboxylic acids, vinyl esters of saturated carboxylic acids, unsaturated epoxides, alicyclic glycidyl esters and ethers, unsaturated carboxylic acids, salts thereof, anhydrides thereof and dienes.

According to one embodiment of the composition, the polyethylene (A) is chosen from LDPE, HDPE, LLDPE, VLDPE, PE obtained by metallocene catalysis, EPR and EPDM elastomers and blends thereof, ethylene/alkyl (meth) acrylate copolymers, ethylene/alkyl (meth)acrylate/maleic anhydride copolymers and ethylene/vinyl acetate/maleic anhydride copolymers.

According to one embodiment of the composition, it is diluted in a polyolefin (C1) and/or a polymer of elastomeric nature (D).

According to one embodiment of the composition, the amount of polyolefin (C1) and/or of polymer of elastomeric nature (D) is advantageously from 20 to 1 000 and preferably from 30 to 500 parts by weight per 10 parts of grafted isotactic polypropylene obtained by metallocene catalysis.

According to one embodiment of the composition, the proportions of polyolefin (C1) and of polymer of elastomeric nature (D) are such that the ratio (D)/(C1) is between 0 and 1 and more particularly between 0 and 0.5.

According to one embodiment of the composition, it is included in a coextrusion binder.

A subject of the invention is also a multilayer structure comprising a layer (L) comprising a composition as described above and, directly attached to the said layer (L), a layer (E):

which is polar, nitrogenous or oxygenated, such as a layer of polyamide resin, of ethylene/saponified vinyl acetate (EVOH) copolymer or of polyester; or of a mineral oxide deposited on a polymer such as PE, polyethylene terephthalate (PET) or EVOH; or which is metallic or metalloplastic.

According to one embodiment of the structure, it comprises a polyolefin-based layer (F) directly attached to the layer (L), the layer (L) thus being sandwiched between the said layer (F) and the layer (E).

The composition based on isotactic polypropylene obtained by metallocene catalysis (miPP) optionally comprises a polymer (A) denoting a polyethylene homopolymer or copolymer and/or a polymer (B) chosen from isotactic polypropylene homopolymer or copolymer (B1), poly-1-butene homopolymer or copolymer (B2), polystyrene homopolymer or copolymer (B3), a blend of (B1) and (B2), a blend of (B2) and (B3), a blend of (B1) and (B3) and a blend of (B1), (B2) and (B3). This means that a blend is grafted which comprises either miPP without polymer (A) and without polymer (B), or miPP and polymer (A), or miPP and polymer (B), or alternatively miPP, polymer (A) and polymer (B). Advantageously, the proportion of polymers (A) and/or (B) represents less than 40% by weight of the combination of the miPP and the polymer (A) and/or the polymer (B).

The isotactic polypropylene obtained by metallocene catalysis, abbreviated hereinbelow as miPP, and the systems for synthesizing it are known and described in the following references from the Applicant: U.S. Pat. No. 6,214,949; U.S. Pat. No. 5,968,854; EP 856 525; U.S. Pat. No. 5,789,502; EP 849 286; EP 802 206; U.S. Pat. No. 5,561,092; EP 581 754.

The isotactic polypropylene obtained by metallocene catalysis (miPP) is, according to the above references, a polymer comprising from 0% to 10% by weight of a comonomer or a blend of comonomers chosen from ethylene, butene, isobutylene and 4-methylpentene.

As regards the polymer (A), it is chosen from polyethylene homopolymers or copolymers.

Comonomers that may be mentioned include:

α-olefins, advantageously those containing from 3 to 30 carbon atoms. Examples of α-olefins containing from 3 to 30 carbon atoms as possible comonomers comprise propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicocene, 1-dococene, 1-tetracocene, 1-hexacocene, 1-octacocene and 1-triacontene. These α-olefins may be used alone or as a blend of two or more than two.

esters of unsaturated carboxylic acids such as, for example, alkyl (meth)acrylates, the alkyls possibly containing up to 24 carbon atoms. Examples of alkyl acrylates or methacrylates are especially methyl methacrylate, ethyl acrylate, n-butyl acrylate, isobutyl acrylate and 2-ethylhexyl acrylate.

vinyl esters of saturated carboxylic acids such as, for example, vinyl acetate or propionate.

unsaturated epoxides. Examples of unsaturated epoxides are, especially: aliphatic glycidyl esters and ethers such as allyl glycidyl ether, vinyl glycidyl ether, glycidyl maleate and itaconate, glycidyl acrylate and methacrylate, and alicyclic glycidyl esters and ethers such as 2-cyclo-hexene-1-glycidyl ether, cyclohexene-4,5-diglycidyl carboxylate, cyclohexene-4-glycidyl carboxylate, 5-norbornene-2-methyl-2-glycidyl carboxylate and endocis-bicyclo[2.2.1]-5-heptene-2,3-diglycidyl dicarboxylate.

unsaturated carboxylic acids, salts thereof and anhydrides thereof. Examples of anhydrides of unsaturated dicarboxylic acid are especially maleic anhydride, itaconic anhydride, citraconic anhydride and tetrahydrophthalic anhydride.

dienes such as, for example, 1,4-hexadiene.

The polymer (A) may comprise several comonomers.

Advantageously, the polymer (A), which may be a blend of several polymers, comprises at least 50 mol % and preferably 75 mol % of ethylene. The density of (A) may be between 0.86 and 0.98 g/cm$^3$. The MFI (viscosity index at 190° C., under 2.16 kg) is advantageously between 1 and 1 000 g/10 min.

Examples of polymers (A) that may be mentioned include:

low density polyethylene (LDPE)

high density polyethylene (HDPE)

linear low density polyethylene (LLDPE)

very low density polyethylene (VLDPE)

the polyethylene obtained by metallocene catalysis, i.e. the polymers obtained by copolymerization of ethylene and of α-olefin such as propylene, butene, hexene or octene in the presence of a single-site catalyst generally consisting of one zirconium or titanium atom and of two cyclic alkyl molecules linked to the metal. More specifically, metallocene catalysts are usually composed of two cyclopentadiene rings linked to the metal. These catalysts are frequently used with aluminoxanes as co-catalysts or activators, preferably methylaluminoxane (MAO). Hafnium may also be used as the metal to which the cyclopentadiene is attached. Other metallocenes may include transition metals from Groups IV A, V A and VI A. Metals of the lanthamide series may also be used.

EPR (ethylene-propylene-rubber) elastomers;

EPDM (ethylene-propylene-diene) elastomers;

blends of polyethylene with an EPR or an EPDM;

ethylene/alkyl (meth)acrylate copolymers possibly containing up to 60% by weight of alkyl (meth)acrylate and preferably from 2% to 40%;

ethylene/alkyl (meth)acrylate/maleic anhydride copolymers obtained by copolymerization of the three monomers, the proportions of alkyl (meth)acrylate being those of the above copolymers, the amount of maleic anhydride being from 0% to 10% and preferably from 0.2% to 6% by weight.

ethylene/vinyl acetate/maleic anhydride copolymers obtained by copolymerization of the three monomers, the proportions of vinyl acetate being the same as those of the alkyl (meth)acrylate in the above copolymers and the proportions of MAH being the same as those of the above copolymers.

As regards the polymer (B1), this is an isotactic polypropylene homopolymer or copolymer obtained by Ziegler-Natta catalysis (zniPP). Comonomers that may be mentioned include:

α-olefins, advantageously those containing from 3 to 30 carbon atoms. Examples of such α-olefins are the same as for (A) except for the replacement of propylene with ethylene in the list, dienes.

The polymer (B1) may also be a copolymer containing polypropylene blocks.

Examples of polymers (B1) that may be mentioned include:

polypropylene blends of polypropylene and of EPDM or EPR.

Advantageously, the polymer (B1) which may be a blend of several polymers, comprises at least 50 mol % and preferably 75 mol % of propylene.

As regards the polymer (B2), it is chosen from poly(1-butene) and copolymers of 1-butene with ethylene and another α-olefin containing from 3 to 10 carbon atoms, except for the propylene (B1) already mentioned.

As regards the polymer (B3), it is chosen from polystyrene and styrene copolymers. Among the copolymers, examples that may be mentioned are dienes containing from 4 to 8 carbon atoms.

As regards the functionalised monomer, it is unsaturated and non-aromatic. Examples that may be mentioned include alkoxysilanes, carboxylic acids and derivatives thereof, acid chlorides, isocyanates, oxazolines, epoxides, amines and hydroxides.

Among the alkoxysilanes bearing an unsaturation, mention may be made of:

vinyltrialkoxysilanes $CH_2=CH-Si(OR)_3$;

allyltrialkoxysilanes $CH_2=CH-CH_2-Si(OR)_3$;

(meth)acryloxyalkyltrialkoxysilanes (or (meth) acrylsilanes)

$CH_2=CR_1-CO-O-Y-Si(OR)_3$ in which: R is an alkyl containing from 1 to 5 carbon atoms or an alkoxy $-R_2OR_3$ in which $R_2$ and $R_3$ are alkyls containing not more than 5 carbon atoms for the combination $R_2$ and $R_3$; $R_1$ is a hydrogen or a methyl; Y is an alkylene containing from 1 to 5 carbon atoms.

Vinylsilanes such as trimethoxyvinylsilane, triethyloxyvinylsilane, tripropoxyvinylsilane, tributoxyvinylsilane, tripentoxyvinylsilane or tris(β-methoxyethoxy) vinylsilane, allylsilanes such as trimethoxyallylsilane, triethoxyallylsilane, tripropoxyallylsilane, tributoxyallylsilane or tripentoxyallylsilane, acrylsilanes such as acryloxymethyltrimethoxysilane, methacryloxymethyl-methoxysilane, acryloxyethyltrimethoxysilane, methacryloxymethylmethoxysilane, acryloxyethyltrimethoxysilane, methacryloxyethyl-trimethoxysilane, acryloxypropyltrimethoxysilane, methacryloxypropyltrimethoxysilane, acryloxybutyl-trimethoxysilane, methacryloxybutylmethoxysilane, acryloxyethyltriethoxysilane, methacryloxyethyl-triethoxysilane, methacryloxyethyltripropoxysilane, acryloxypropyltributoxysilane or methacryloxypropyl-tripentoxysilane are used, for example.

It is also possible to use blends of these products. The following are preferably used:

vinyltrimethoxysilane (VTMO) $CH_2=CH-Si-(OCH_3)_3$;

vinyltriethoxysilane (VTEO) $CH_2=CH-Si-(OCH_2CH_3)_3$;

vinyltrimethoxyethoxysilane (VTMOEO) $CH_2=CH-Si-(OCH_2OCH_2CH_3)_3$; and (3-(methacryloxy)propyl)trimethoxysilane $CH_2=C(CH_3)-C(O)O-(CH_2)_3-Si(OCH_3)_3$.

Examples of unsaturated carboxylic acids are those containing from 2 to 20 carbon atoms such as acrylic acid, methacrylic acid, maleic acid, fumaric acid and itaconic acid. The functional derivatives of these acids comprise, for example, anhydrides, ester derivatives, amide derivatives, imide derivatives and metal salts (such as alkali metal salts) of unsaturated carboxylic acids.

Unsaturated dicarboxylic acids containing from 4 to 10 carbon atoms and functional derivatives thereof, particularly anhydrides thereof, are grafting monomers that are particularly preferred.

These grafting monomers comprise, for example, maleic acid, fumaric acid, itaconic acid, citraconic acid, allylsuccinic acid, cyclohex-4-ene-1,2-dicarboxylic acid, 4-methylcyclohex-4-ene-1,2-dicarboxylic acid, bicyclo[2.2.1]hept-5-ene-2,3-dicarboxylic acid, x-methylbicyclo[2.2.1]hept-5-ene-2,3-dicarboxylic acid, maleic anhydride, itaconic anhydride, citraconic anhydride, allylsuccinic anhydride, cyclohex-4-ene-1,2-dicarboxylic anhydride, 4-methylenecyclohex-4-ene-1,2-dicarboxylic anhydride, bicyclo[2.2.1]hept-5-ene-2,3-dicarboxylic anhydride and x-methylbicyclo[2.2.1]hept-5-ene-2,2-dicarboxylic anhydride.

Examples of other grafting monomers comprise C1–C8 alkyl esters or glycidyl ester derivatives of unsaturated carboxylic acids, such as methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate and diethyl itaconate; amide derivatives of unsaturated carboxylic acids such as acrylamide, methacrylamide, maleic monoamide, maleic diamide, maleic N-monoethylamide, maleic N,N-diethylamide, maleic N-monobutylamide, maleic N,N-dibutylamide, fumaric monoamide, fumaric diamide, fumaric N-monoethylamide, fumaric N,N-diethylamide, fumaric N-monobutylamide and fumaric N,N-dibutylamide; imide derivatives of unsaturated carboxylic acids such as maleimide, N-butylmaleimide and N-phenylmaleimide; and metal salts of unsaturated carboxylic acids such as sodium acrylate, sodium methacrylate, potassium acrylate and potassium methacrylate.

Various known processes may be used to graft the miPP composition optionally comprising (A) and/or (B) with a grafting monomer.

For example, the grafting may be performed by heating this composition to a high temperature, about 150° C. to about 300° C., in the presence or absence of a solvent with or without free-radical initiator.

Suitable solvents that may be used in this reaction are benzene, toluene, xylene, chlorobenzene and cumene, inter alia.

Suitable free-radical initiators that may be used comprise t-butyl hydroperoxide, cumene hydroperoxide, diisopropylbenzene hydroperoxide-, di-t-butyl peroxide, t-butylcumyl peroxide, dicumyl peroxide, 1,3-bis(t-butylperoxyisopropyl)benzene, acetyl peroxide, benzoyl peroxide, isobutyryl peroxide, bis(3,5,5-trimethylhexanoyl) peroxide and methyl ethyl ketone peroxide.

The miPP and optionally (A) and/or (B) may be dry-premixed or melt-premixed and then melt-grafted or solution-grafted in a solvent. They may also be added separately in a device for placing in contact and blending (for example an extruder) with the grafting monomer and the free-radical initiator. The usual devices of the thermoplastics industry for mixing and blending may be used.

The amount of grafting monomer may be chosen in a suitable manner, but it is preferably from 0.01% to 10% and preferentially from 0.1% to 5% relative to the weight of the grafted composition of miPP optionally comprising the polymer (A) and/or the polymer (B). The amount of grafted monomer is determined by assaying the succinic functions by FTIR spectroscopy.

The invention also relates to a composition comprising miPP grafted and then optionally diluted in at least one polyolefin (C1) and/or in at least one polymer of elastomeric nature (D).

The polyolefin (C1) may be chosen from the polymers (A), (B) and miPP.

The polymer (D) is a polymer of elastomeric nature, that is to say that it may-be:
(i) an elastomer within the meaning of ASTM D412, meaning that it may be stretched at ambient temperature to twice its width, maintained in this state for 5 minutes and then returned to within 10% of its initial length when it is released; or
(ii) a polymer not having exactly the above characteristics, but which may be stretched and returned substantially to its initial length.

Advantageously, the MFI of (D) is between 0.1 and 50 g/10 min.

Examples of polymers (D) that may be mentioned include:
EPR (ethylene-propylene-rubber) and EPDM (ethylene-propylene-diene);
polyethylenes obtained by metallocene catalysis, with a density of less than 0.910 g/cm$^3$;
polyethylenes of VLDPE type (very low density PE);
styrene elastomers such as SBR (styrene-butadiene-rubber), styrene/butadiene/styrene (SBS) block copolymers, styrene/ethylene/butene/styrene (SEBS) block copolymers and styrene/isoprene/styrene (SIS) block copolymers;
copolymers of ethylene and of at least one unsaturated carboxylic acid ester (already-defined above for (A));
copolymers of ethylene and of at least one vinyl ester of a saturated carboxylic acid (already defined above for (A)).

The amount of (C1) and/or (D) is advantageously from 20 to 1 000 and preferably 60 to 500 parts (by weight) per 10 parts of grafted miPP. Advantageously, (C1) and (D) are used. The preferred proportions are such that (D)/(C1) is between 0 and 1 and more particularly between 0 and 0.5.

The composition according to the invention may be manufactured by the usual means of thermoplastics by melt-blending the various constituents in BUSS twin-screw extruders, blenders or roll mills.

This composition may comprise various additives such as antioxidants, ultraviolet absorbers, antistatic agents, pigments, colorants, nucleating agents, fillers, glidants, lubricants, flame retardants and anti-blocking agents.

As regards the multilayer structure according to the invention, it comprises a layer (L) comprising the composition according to the invention and, directly attached thereto, a layer (E) that may be a layer (i) of oxygenated or nitrogenous polar resin, (ii) of a mineral oxide deposited on a polymer such as polyethylene (PE), polyethylene-terephthalate (PET) or ethylene/vinyl alcohol (EVOH) copolymer or (iii) a metallic or metalloplastic layer.

Examples of polar resins that are preferred in the layer (E) are polyamide resins, an ethylene/saponified vinyl acetate or EVOH copolymer, and polyesters.

More specifically, these polar resins comprise long-chain synthetic polyamides containing amide-group structural units in the main chain, such as PA-6, PA-6,6, PA-6,10, PA-11 and PA-12; an ethylene/saponified vinyl acetate copolymer with a degree of saponification of about 90 to 100 mol %, obtained by saponifying an ethylene/vinyl acetate copolymer with an ethylene content from about 15 mol % to about 60 mol %; polyesters such as polyethylene terephthalate (PET), polybutylene terephthalate (PBT), polyethylene naphthenate and blends of these polar resins.

The mineral oxide layer may be, for example, silica, deposited on a layer of PE, PET or EVOH. In this case, the structure according to the invention thus comprises, successively: a binder layer comprising the composition according to the invention attached to a layer of $SiO_2$ (or $SiO_x$), which is itself deposited on a layer of PE, PET or EVOH.

The metallic layer may be, for example, a film or a sheet of a metal such as aluminium, iron, copper, tin or nickel, or an alloy containing at least one of these metals as major constituent. The thickness of the film or sheet is, for example, from about 0.01 to about 0.2 mm. It is common practice to degrease the surface of the metallic layer before coating it with the binder comprising the composition according to the invention. This layer (E) may also be a metalloplastic layer such as, for example, an aluminium-coated PET sheet.

It would not constitute a departure from the context of the invention if the above structure was combined with other layers.

The invention also relates to the structure described above combined, on the side remaining free of the binder layer (L), with a polyolefin-based layer (F), the binder layer thus allowing the layers (E) and (F) to adhere together. The structure defined herein is of the form layer (F)/layer (L)/layer (E). The polyolefin of the layer (F) may be chosen from the polymers (A) and (B) described above.

These structures are useful for making wrappings, for example rigid hollow bodies such as flasks, bottles, flexible bags or multilayer films.

The structures according to the invention are, for example, of the form below with the binder comprising the composition according to the invention:

layer (F)/layer (L)/layer (E)/layer (L)/layer (F): PE/binder/EVOH/binder/PE or PP/binder/EVOH/binder/PP layer (F)/layer (L)/layer (E): PE/binder/EVOH or PE/binder/PA or PP/binder/PA.

These structures and these wrappings may be manufactured by coextrusion, lamination, extrusion blow-moulding and coating.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

The entire disclosure(s) of all applications, patents and publications, cited above or below, and of corresponding French Application No. 0110252, filed Jul. 31, 2001, is hereby incorporated by reference.

The products below were used to perform the tests and comparisons that follow:

miPP 1: miPP containing 3.5% ethylene, of density=0.900 g/cm$^3$ and MFI 7 g/10 min (at 230° C. under 2.16 kg).

miPP 2: miPP containing 3.5% ethylene, of density=0.900 g/cm$^3$ and MFI=8 g/10 min (at 230° C. under 2.16 kg).

miPP 3: miPP containing 5% ethylene, of density=0.900 g/cm$^3$ and MFI=2.5 g/10 min (at 230° C. under 2.16 kg).

PP 3060 MN 5: isotactic polypropylene containing propylene and ethylene blocks, obtained by Ziegler-Natta catalysis (zniPP), of density=0.902 g/cm$^3$ and MFI=6 g/0.10 min (at 230° C. under 2.16 kg).

PP 3020 GN3: random polypropylene copolymer obtained by Ziegler-Natta catalysis (zniPP), of density=0.900 g/cm$^3$ and MVI (Melt Volume Index)=2 cm$^3$/10 min (at 230° C. under 2.16 kg).

MAH: maleic anhydride.

LLDPE: linear low density polyethylene, of density=0.900 g/cm$^3$ and MFI=3 g/10 min (at 190° C. under 2.16 kg).

The products are manufactured in a Leistritz co-rotary twin-screw extruder and grafted with maleic anhydride.

The extruder comprises eight zones referred to as Z1 to Z8, zone Z8 being at the end of the extruder on the outlet side of the grafted products. The process is performed at usual temperatures known to those skilled in the art.

The maleic anhydride, on polyethylene powder, and the polypropylene to be grafted are introduced into zone Z1 via two separate weight-metering devices.

The free-radical initiator, in pure form or diluted in a suitable solvent, is introduced via a metering pump into zone Z2. The temperatures in zones Z3, Z4 and Z5 are at least sufficient for 99.9% of the free-radical initiator to react before zone Z6. The initiator used is 2,5-dimethyl-2,5-(di-tert-butyl)hexane peroxide or DHBP (Luperox® 101). The residues of the free-radical initiator, the solvent and the unreacted maleic anhydride are degassed under vacuum in zone Z6.

The extrusion flow rate leaving the zone Z8 varies according to the screw speed, set between 12 and 15 kg/h. The extrudate is granulated after cooling.

Table 1 collates the results of the grafting of miPP with MAH for Examples Ex2, Ex3 and Ex4 and of zniPP with MAH for the comparative Cp1. All the percentages are on a weight basis and the weight percentages of MAH and of initiator are relative to 100% of miPP or zniPP, depending on the case.

It is found that, for the grafted zniPP (Comparative Cp1), the MFI obtained is 13.5 g/10 min, whereas it remains less than or equal to 10 g/10 min for the examples of grafted miPP according to the invention (Ex2, Ex3 and Ex4) for a virtually equivalent percentage of grafted MAH.

A five-layer structure consisting successively and respectively of PP/binder/EVOH/binder/PP, in which:

PP denotes a layer of isotactic polypropylene obtained by Ziegler-Natta catalysis (zniPP), binder denotes a layer comprising the composition defined in Table 2, and EVOH denotes a layer of ethylene/vinyl alcohol copolymer, was then produced by cast technology.

The thickness of the successive layers is, respectively, in µm: 20/10/10/10/50.

The peel force between the 20-µm PP layer and the 10-µm binder layer was then measured. The binder compositions in weight percentages, the peel forces (expressed in N/15 mm at a pulling speed of 200 mm/min) at times t=0 (immediately after producing the structure) and t=8 days (8 days after producing the structure) and the standard deviations (s) are given in Table 2.

It is found that the binder compositions comprising grafted miPP gives better adhesion results than the binder compositions comprising grafted zniPP instead of grafted miPP.

TABLE 1

|  | PP | MAH introduced (%) | DHBP introduced (%) | MFI in g/10 min (at 190° C. under 325 g) | % MAH grafted after stoving |
|---|---|---|---|---|---|
| Cp1 | PP3060 MN 5 | 100 | 1.8 | 0.1600 | 13.5 | 0.58 |
| Ex2 | miPP 1 | 100 | 1.8 | 0.1600 | 8.4 | 0.49 |
| Ex3 | miPP 2 | 100 | 1.8 | 0.1600 | 7.5 | 0.55 |
| Ex4 | miPP 3 | 100 | 1.8 | 0.1600 | 10 | 0.53 |

TABLE 2

|  | BINDER composition | | | | | | Peel force at | | Peel force at | |
|---|---|---|---|---|---|---|---|---|---|---|
|  | zniPP (C1) | (%) | PE (D) | (%) | MAH grafted PP | (%) | t = 0 days (N/15 mm) | s at t = 0 days | t = 8 days (N/15 mm) | s at t = 8 days |
| Ex5 | PP 3020GN3 | 57 | LLDPE | 18 | miPP1* | 25 | 2.7 | 0.22 | 5.19 | 0.21 |
| Ex6 | PP 3020GN3 | 57 | LLDPE | 18 | miPP2** | 25 | 3.54 | 0.29 | 5.64 | 0.24 |

TABLE 2-continued

| | BINDER composition | | | | | Peel force at | | Peel force at | |
|---|---|---|---|---|---|---|---|---|---|
| | zniPP (C1) | (%) | PE (D) | (%) | MAH grafted PP | (%) | t = 0 days (N/15 mm) | s at t = 0 days | t = 8 days (N/15 mm) | s at t = 8 days |
| Ex7 | PP 3020GN3 | 57 | LLDPE | 18 | miPP3*** | 25 | 4.11 | 0.1 | 5.85 | 0.12 |
| Cp8 | PP 3020GN3 | 57 | LLDPE | 18 | PP3060 MN5**** | 25 | 2.27 | 0.13 | 4.22 | 0.21 |

*grafted miPP obtained in Ex2;
**grafted miPP obtained in Ex3;
***grafted miPP obtained in Ex4;
****grafted zniPP obtained in Cp1.

The preceding examples can be repeated with similar success by substituting the generically or specifically described reactants and/or operating conditions of this invention for those used in the preceding examples. From the foregoing description, one skilled in the art can easily ascertain the essential characteristics of this invention and, without departing from the spirit and scope thereof, can make various changes and modifications of the invention to adapt it to various usages and conditions.

What is claimed is:

1. A multilayer structure comprising a layer (L) containing a composition comprising 10% to 100% by weight of isotactic polypropylene homopolymer or copolymer obtained by metallocene catalysis (miPP);

0% to 90% by weight of polyethylene (A) homopolymer or copolymer;

0% to 90% by weight of polymer (B) selected from the group consisting of isotactic polypropylene homopolymer or copolymer obtained by Ziegler-Natta catalysis (B1), poly-(1-butene)homopolymer or copolymer (B2), polystyrene homopolymer or copolymer (B3), a blend of (B1) and (B2), a blend of (B1) and (B3), a blend of (B2) and (B3), and a blend of (B1), (B2) and (3);

the percentages beina based on the total weight of the isotactic polymer (miPP) and any polymer (A) and polymer (B); and said polymer or polymers being grafted with a functionalised monomer;

and, directly attached to said layer (L), a layer (E), which is polar, nitrogenous or oxygenated, a mineral oxide deposited on a polymer, or metallic or meralloplastic.

2. The multilayer structure according to claim 1, wherein the functionalised monomer is unsaturated and non-aromatic.

3. The multilayer structure according to claim 1, wherein the functionalised monomer is selected from the group consisting of alkoxysilanes, carboxylic acids, acid chlorides, isocyanates, oxazolines, epoxides, amines and hydroxides.

4. The multilayer structure according to claim 1, wherein the functionalised monomer is maleic anhydride.

5. The multilayer structure according to claim 1, comprising polyethylene homopolymer or polyethylene (A) copolymer having at least one comonomer selected from the group consisting of α-olefins containing 3 to 30 carbon atoms, esters of unsaturated carboxylic acids, vinyl esters of saturated carboxylic acids, unsaturated epoxides, alicyclic glycidyl esters and ethers, unsaturated carboxylic acids, salts thereof, anhydrides thereof, and dienes.

6. The multilayer structure according to claim 1, comprising polyethylene (A) selected from the group consisting of LDPE, HDPE, LLDPE, VLDPE, PE obtained by metallocene catalysis, EPR and EPDM elastomers and blends thereof, ethylene/alkyl (meth)acrylate copolymers, ethylene/alkyl (meth)acrylate/maleic anhydride copolymers and ethylene/vinyl acetate/maleic anhydride copolymers.

7. The multilayer structure according to claim 1, said layer (L) further comprising a polyolefin (C1) and/or a polymer of elastomeric nature (D).

8. The multilayer structure according to claim 7, wherein the amount of polyolefin (C1) and/or of polymer of elastomeric nature (D) is 20 to 1,000 parts by weight per 10 parts of grafted isotactic polypropylene obtained by metallocene catalysis.

9. The multilayer structure according to claim 7, wherein the proportions of polyolefin (C1) and of polymer of elastomeric nature (D) are such that the radio (D)/(C1) is between 0 and 1.

10. The multilayer structure according to claim 1, further comprising coextrusion binder.

11. A multilayer structure according to claim 1, wherein layer (E) is a layer of polyamide resin, of ethylene/saponified vinyl acetate (EVOH) copolymer or of polyester.

12. A multilayer structure according to claim 11, wherein layer (E) is a mineral oxide deposited on PE, polyethylene terephthalate (PET) or (EVOH).

13. A structure according to claim 1, comprising a polyolefin-based layer (F) directly attached to the layer (L), the layer (L) thus being sandwiched between the said layer (F) and the layer (E).

14. A wrapping or a rigid hollow body or flexible container, comprising a structure as claimed in claim 1.

15. A multilayer structure comprising a layer (L) containing a composition comprising:

10% to 100% by weight of isotactic polypropylene homopolymer or copolymer obtained by metallocene catalysis (miPP) said isotactic polypropylene copolymer comprising not more than 10% of a comonomer selected from the group consisting of ethylene, butene, isobutylene, 4-methyl pentene, and mixtures thereof;

0% to 90% by weight of polyethylene (A) homopolymer or copolymer;

0% to 90% by weight of polymer (B) selected from the group consisting of isotactic polypropylene homopolymer or copolymer obtained by Ziegler-Natta catalysis (B1), poly-(1-butene)homopolymer or copolymer (B2), polystyrene homopolymer or copolymer (B3), a blend of (B1) and (B2), a blend of (B1) and (B3), a blend of (B2) and (B3), and a blend of (B1), (B2), and (B3);

the percentages being based on the total weight of the isotactic polymer (miPP) and any polymer (A) and polymer (B); and said polymer or polymers being grafted with a functionalised monomer, and directly attached to said layer (L), a layer (E), which is polar, nitrogenous or oxygenated, a mineral oxide deposited on a polymer, or metallic or metalloplastic.

16. The multilayer structure according to claim 15, wherein the functionalised monomer is unsaturated and non-aromatic.

17. The multilayer structure according to claim 15, wherein the functionalised monomer is selected from the group consisting of alkoxysilanes, carboxylic acids, acid chlorides, isocyanates, oxazolines, epoxies, amines and hydroxides.

18. The multilayer structure according to claim 15, wherein the functionalised monomer is maleic anhydride.

19. The multilayer structure according to claim 15, comprising polyethylene homopolymer or polyethylene (A) copolymer having at least one comonomer selected from the group consisting of α-olefins containing 3 to 30 carbon atoms, esters of unsaturated carboxylic acids, vinyl esters of saturated carboxylic acids, unsaturated epoxides, alicyclic glycidyl esters and ethers, unsaturated carboxylic acids, salts thereof, anhydrides thereof, and dienes.

20. The multilayer-structure according to claim 15, comprising polyethylene (A) selected from the group consisting of LDPE, HDPE, LLDPE, VLDPE, PE obtained by metallocene catalysis, EPF and EPDM elastomers and blends thereof, ethylene/alkyl (meth)acrylate copolymers, ethylene/alkyl (meth)acrylate/maleic anhydride copolymers and ethylene/vinyl acetate/maleic anhydride copolymers.

21. The multilayer-structure according to claim 15, said layer (L) further comprising a polyolefin (C1) and/or a polymer of elastomeric nature (D).

22. The multilayer structure according to claim 21, wherein the amount of polyolefin (C1) and/or of polymer of elastomeric nature (D) is 20 to 1,000 parts by weight per 10 parts of grafted isotactic polypropylene obtained by metallocene catalysis.

23. The multilayer structure according to claim 21, wherein the proportions of polyolefin (C1) and of polymer of elastomeric nature (D) are such that the ratio (D)/(C1) is between 0 and 1.

24. The multilayer structure according to claim 15, further comprising coextrusion binder.

25. A multilayer structure according to claim 15, wherein layer (E) is a layer of polyamide resin, of ethylene/saponified vinyl acetate (EVOH)copolymer or of polyester.

26. A multilayer structure according to claim 25, wherein layer (E) is a mineral oxide deposited on PE, polyethylene terephthalate (PET) or (EVOH).

27. A structure according to claim 15, comprising a polyolefin-based layer (F) directly attached to the layer (L), the layer (L) thus being sandwiched between the said layer (F) and the layer (E).

28. A wrapping or a rigid hollow body or flexible container, comprising a structure as claimed in claim 15.

29. A multilayer structure according to claim 15, comprising polymer (B) in layer (L).

30. A multilayer structure according to claim 15, comprising both (A) and (B) in layer (L).

31. A multilayer structure comprising a layer (L) containing a composition comprising:

10% to 100% by weight of isotactic polypropylene homopolymer or copolymer obtained by metallocene catalysis (miPP);

0% to 90% by weight of polyethylene (A) homopolymer or copolymer;

0% to 90% by weight of polymer (B) selected from the group consisting of isotactic polypropylene homopolymer or copolymer obtained by Ziegler-Natta catalysis (B1), poly-1(butene)homopolymer or copolymer (B2), polystyrene homopolymer or copolymer (B3), a blend of (B1) and (B2), a blend of (B1) and (B3), a blend of (B2) and (B3), and a blend of (B1), (B2), and (B3);

the percentages being based on the total weight of the isotactic polymer (miPP) and any polymer (A) and polymer (B); and said polymer or polymers being grafted with a functionalised monomer, and wherein said composition is diluted in a polyolefin (C1) and/or a polymer of elastomeric nature (D), and directly attached to said layer (L), a layer (E), which is polar, nitrogenous or oxygenated, a mineral oxide deposited on a polymer, or metallic or metalloplastic.

32. The multilayer structure according to claim 31, wherein the amount of polyolefin (C1) and/or of polymer of elastomeric nature (D) is 20 to 1,000 parts by weight per 10 parts of grafted isotactic polypropylene obtained by metallocene catalysis.

33. The multilayer structure according to claim 31, wherein the proportions of polyolefin (C1) and of polymer of elastomeric nature (D) are such that the ratio (D)/(C1) is between 0 and 1.

34. The multilayer structure according to claim 21, wherein the amount of polyolefin (C1) and/or of polymer of elastomeric nature (D) is 20 to 1,000 parts by weight per 10 parts of grafted isotactic polypropylene obtained by metallocene catalysis, and said composition further comprising a coextrusion binder.

* * * * *

UNITED STATES PATENT AND TRADEMARK OFFICE
CERTIFICATE OF CORRECTION

PATENT NO. : 6,890,661 B2
DATED : May 10, 2005
INVENTOR(S) : Jean-Laurent Pradel It is certified that error appears in the above-identified patent and that said Letters Patent is hereby corrected as shown below:

Column 11,
Line 37, "(3)" should read -- (B3) --.
Line 38, "beina" should read -- being --.
Line 47, "meralloplastic" should read -- metalloplastic --.

Column 12,
Line 29, "radio" should read -- ratio --.

Signed and Sealed this

Twenty-third Day of August, 2005

JON W. DUDAS
*Director of the United States Patent and Trademark Office*